United States Patent [19]

Cronk

[11] Patent Number: 5,490,742
[45] Date of Patent: Feb. 13, 1996

[54] MODULAR PROTECTIVE PIPELINE COVER

[76] Inventor: Tommy J. Cronk, P.O. Box 11189 90 Two Rivers Pipeline, Odessa, Tex. 79760

[21] Appl. No.: 71,727

[22] Filed: Jun. 4, 1993

[51] Int. Cl.$^6$ ..................................................... F16L 57/00
[52] U.S. Cl. ........................... 405/157; 405/154; 138/110
[58] Field of Search ..................................... 405/154, 157, 405/216; 138/104, 105, 110; 285/45, 921

[56] References Cited

U.S. PATENT DOCUMENTS

| | | | |
|---|---|---|---|
| 3,568,626 | 3/1971 | Southworth, Jr. . | |
| 3,999,399 | 12/1976 | Maurer | 405/216 X |
| 4,329,084 | 5/1982 | Chapa . | |
| 4,396,797 | 8/1983 | Sakuragi et al. | 138/110 X |
| 4,623,282 | 11/1986 | Allen . | |
| 4,699,838 | 10/1987 | Gilbert | 405/157 X |
| 4,808,031 | 2/1989 | Baker . | |
| 4,874,648 | 10/1989 | Hill et al. | 138/110 X |
| 4,877,660 | 10/1989 | Overbergh et al. | 138/110 X |
| 4,879,162 | 11/1989 | Hanser, Sr. . | |
| 4,909,669 | 3/1990 | Baker . | |
| 5,099,889 | 3/1992 | Ratzlaff | 138/110 |
| 5,102,265 | 4/1992 | Dokmo et al. | 405/216 |

OTHER PUBLICATIONS

Phillips Driscopipe, Inc., "Driscopipe Technical Notes," *PDI TN–2* Jan. 1, 1987.
Phillips Driscopipe, Inc., "Driscopipe technical Notes," *PDI TN–6* Feb. 18, 1987.
Phillips Driscopipe, Inc., "Driscopipe Technical Notes," *PDI TN–7* Mar. 16, 1987.
Phillips Driscopipe, Inc., "Driscopipe Technical Notes," *PDI TN–8* Apr. 6, 1987.
Phillips Driscopipe, Inc., "6400 Series Oil & Gas Pipe: Dimension and Pressure Ratings," Oct. 31, 1990.
Phillips Driscopipe, Inc., "Driscopipe® 6400: Polyethylene Piping Systems for Energy and Environmental Applications," 1991.

*Primary Examiner*—Dennis L. Taylor
*Attorney, Agent, or Firm*—Arnold, White & Durkee

[57] ABSTRACT

A portable, modular and easily applied protective pipeline covering which resists impact, penetration and tearing while providing an appearance which enhances visibility. In certain embodiments, a plurality of layers encodes information on the substance carried by the pipeline and the depth of penetration of any tear or abrasion. The covering comprises a resilient wall matrix and may include an outer layer which is relatively penetration-resistant. Modular covers may be flexible, semi-rigid or rigid. They are applied in modules which each comprise one or more pieces which substantially conform to the pipeline surface, being held in place by circumferential tension elements or, in the case of flexible covers which are wrapped or wound on a pipeline, may be inhibited from unwinding by circumferential tension elements or adhesion means coupled to the cover material. Each cover module has attachment means on each end to allow linking of cover modules after placement on the pipeline. In certain embodiments, fiber reinforcement is embedded in the resilient wall matrix, an outer layer (if present), or both, to better resist penetration and tearing of the cover.

20 Claims, 9 Drawing Sheets

MODULAR PROTECTIVE PIPELINE COVER

BACKGROUND

1. Field of the Invention

The invention relates to methods and apparatus to identify and protect existing pipelines from impact damage.

2. Avoiding Pipeline Damage

Whether buried or not, pipelines are susceptible to accidental impact damage, ranging from abrasion of protective or identifying coatings to puncture. A frequent source of pipeline damage is the impact of heavy equipment used for excavations in urban and industrial settings having buried pipelines. In the latter cases, accidental damage may initially be reduced by careful hand excavation in known pipeline locations, but thereafter, as in the case of normally exposed pipelines, good pipeline visibility and puncture resistance are important factors in damage avoidance.

Because heavy excavation equipment may so easily damage recently excavated pipelines relatively small operator control errors may be associated with pipe puncture and the resultant explosive release of hazardous materials or disruption of electrical power and communications links. The adverse environmental effects, economic loss, and liability for injuries and property damage may be severe. Thus, several warning and protective systems have been developed to alert construction workers to the presence of buried pipelines and to protect normally exposed or excavated pipes from damage.

After a buried pipeline is located and the region around it excavated by hand shovel, the pipe may be temporarily protected from further damage. One method of protection calls for use of an arch structure which spans and covers the pipe, as described in U.S. Pat. No. 4,329,084 (Chapa). Such a structure is intended to allow a trenching machine to ride over the arch while preventing harmful contact with the pipe. The arch, however, has limited utility when, for example, power excavation beneath the pipe or other operation of heavy equipment exposes unprotected portions of the pipe to a risk of impact damage.

Pipeline joint protectors which may be uniformly or nonuniformly circumferentially effective are described in U.S. Pat. Nos. 4,808,031 and 4,909,669 (Baker). These protectors, however, are described for use between concrete weight coated sections of pipelines and are not adapted specifically for high visibility or to resist puncture damage.

Thus, there is a need for easily applied warning and protective systems to provide substantially complete circumferential puncture resistance on an exposed pipeline. In addition to limiting damage from accidental impacts on the pipeline, such systems should provide sufficient visibility or other means to insure a reduced likelihood of actual accidental contact with a protected pipeline.

SUMMARY OF THE INVENTION

Protective pipeline covers of the present invention combine identification and warning functions with substantially circumferential protection against penetration, tearing and abrasion when applied to exposed portions of pipelines. The covers comprise easily applied, easily-removable, highly-visible, impact-and-puncture-resistant portable modular coverings which preferably substantially conform to the outer contour of the pipe (i.e., substantially encircling the pipeline) and which may be connected in a modular fashion after application to a pipeline to form a substantially continuous cover.

Protective Cover Forms and Force Distribution

Covers of the present invention may vary in form or structure from rigid and semi-rigid cylindrical shapes to flexible blankets. A modular cover of the present invention may be intended to protect, for example, a (longitudinal) section along the length of the pipeline, a pipeline accessory (e.g., a valve), or a junction of two or more pipelines. One or more additional modular covers may subsequently be applied to a pipeline or pipeline junction and then joined by attaching means to one or more earlier-applied covers to provide pipeline protection which is substantially continuous both longitudinally and circumferentially, with no significant gaps between cover modules. Pipeline shapes to which protective covers of the present invention may be applied include straight and curved pipes, as well as a variety of flanges, joints, valves, couplings and related accessories.

Preferred embodiments of the modular covers have an inner surface and an outer surface and one or more layers. Rigid and semi-rigid covers comprise one or more longitudinal segments, each having a first end and a second end. A flexible blanket has an inner surface and an outer surface and a blanket width which is less than or equal to the length of pipeline protected when the blanket is wrapped circumferentially around the pipeline. Flexible blanket material for pipeline covers according to the present invention may be supplied in bulk rolls (each roll having a roll width substantially equal to the blanket width). Blanket material has first and second lateral edges and a free leading edge which is preferably used to initiate wrapping of the material circumferentially around a portion of a pipeline to be protected.

The outer surface of each pipeline cover of the present invention, regardless of form (i.e., rigid, semi-rigid or flexible), has high visibility relative to objects in the environments in which it is expected to be used. Such high visibility is a function of structural features including, but not limited to, color, texture, luminance, or diffuse reflectance as described herein. In particular, diffuse reflectance of the outer surface of each pipeline cover of the present invention is greater than about 10%, preferably greater than about 30%. Note that treatments or structural features to enhance visibility comprise the parameters characteristic of outer surfaces of all pipeline covers of the present invention, and in certain embodiments such visibility-enhancing treatments or structural features may extend through the substance of one or more of the layers underlying the outer surface (i.e., layers which would lie between the cover's outer surface and a pipe if the cover were applied to the pipe).

All pipeline covers of the present invention, whether single or multiple layer, comprise at least one puncture-resistant layer. As applied to the present invention, the term puncture-resistant pertains to a layer comprising material having tensile strength of at least about 50 pounds per square inch (psi) and preferably at least about 200 psi, and a minimum thickness of at least about 0.1 inch. Certain preferred embodiments of pipeline covers of the present invention comprise at least one puncture-resistant layer wherein the layer comprises material having a tensile strength greater than about 1000 psi.

Further, all covers of the present invention comprise a wall matrix. Pipeline covers in various embodiments may comprise a single layer (i.e., a layer comprising a wall matrix), or a plurality of layers wherein at least one layer comprises a wall matrix. All wall matrices of the present invention, when transmitting a concentrated force applied through such a matrix to a pipeline (as from a backhoe striking the pipeline), act to distribute the force along the pipeline to an area greater than the area in which the concentrated force is applied to the matrix. This action tends to inhibit the tendency of the force to rupture, deform, or otherwise damage the pipeline or any coating, wrap or surface treatment applied to the pipeline.

Thus, the pipeline itself, preexisting coatings or wraps applied to the pipeline (e.g., to inhibit corrosion or identify contents), and pipeline covers of the present invention are similarly protected by the force-distributing action of a wall matrix. Note that in certain embodiments of pipeline covers of the present invention, a wall matrix layer may comprise puncture-resistant material. In such embodiments, a single layer may both facilitate load force distribution as described herein and impart puncture resistance to the cover. Such covers comprise a wall matrix and a layer of puncture-resistant material which are substantially the same layer.

Effective force-distribution action in pipeline covers of the present invention generally occurs in a sufficiently thick wall matrix, i.e., greater than about ½ inch and preferably greater than about 1 inch. Force distribution action for a given wall matrix may be enhanced, for example, by addition of woven fiber reinforcement within the matrix, or by addition of one or more outer layers which are preferably at least as puncture and tear resistant as the given wall matrix.

The above force-distribution may occur, for example, in wall matrices comprising substantially uniform compositions of rigid or semi-rigid polymers (or similar impact-resistant materials) in a pipeline cover comprising a single wall matrix layer. A second example of force distribution as in the present invention may occur in a pipeline cover comprising a relatively thin but puncture and tear-resistant layer which overlies a relatively thicker and more resilient layer (e.g., a woven fiber reinforced outer layer over a thicker inner layer substantially comprising high-density polyurethane foam). A third example of force distribution as in the present invention may occur in a pipeline cover comprising a wrap of one or more layers of flexible blanket material as described herein. Such blanket material may itself have a plurality of layers (e.g., see the second example above), or it may comprise a single layer of substantially uniform and sufficiently thick (puncture and tear-resistant) composition. Examples of the latter preferred embodiment include pipeline covers comprising at least one layer of flexible blanket material of substantially uniform woven fiber composition (e.g., aramid fiber and/or nylon).

Modular covers may comprise a wall matrix of a single species (e.g.: woven fibrous material such as aramid fiber or nylon; solid, impact-resistant plastic such as polyethylene; or high-density foam plastic such as polyurethane), or a combination of such species. In single-species covers of the present invention, the species will preferably have a thickness sufficient to effectively distribute concentrated loads applied through the cover to a relatively larger area of an underlying pipe to which the cover may be applied. Such load force distribution has the dual effects of reducing the tendency of impact loads to damage the pipe or to crush the outermost portion of the cover against the pipe.

Load force distribution in pipeline covers of the present invention is a function of factors including, but not limited to, tensile strength, resilience and thickness of the cover. Note that cover thickness can be varied in a stepwise manner by successive applications of cover materials, as by winding flexible blanket cover material over portions of a pipeline to achieve a sufficient total depth for the purposes of achieving load force distribution effective in enhancing pipeline protection against penetration or impact damage.

Load force distribution is generally readily achieved in rigid shell cover forms comprising high-impact polymer materials, which preferably comprise a plurality of longitudinal segments easily assembled into a cylindrical shape as they are applied around a pipe. Semi-rigid cylindrical forms, with load distribution characteristics analogous to rigid forms, may comprise a single substantially cylindrical segment having a substantially longitudinal split extending from the first end to the second end which allows the cylindrical segment to be spread sufficiently to facilitate placement around a pipe.

Securing Protective Covers Around Pipelines

Certain embodiments of the present invention comprising flexible, semi-rigid and rigid cover forms are preferably bound in place around the pipeline by circumferential tension members comprising, e.g., metal or plastic bands, hook-and-loop fastener straps, or other fibrous structures with at least some fibers oriented substantially circumferentially, as well as tension-bearing fasteners for joining portions of tension members. Note that the tension members need not be continuous, but may incorporate portions of one or more cover segments serving the function of transmitting a complete circumferential tension force acting to bind the cover segment(s) circumferentially around the pipe. Circumferential tension members may be substantially adjacent to an inner segment surface or an outer segment surface, or they may be embedded within a segment wall matrix.

Certain alternate preferred embodiments of pipeline covers of the present invention comprise a type of flexible blanket material (i.e., curling blanket material) which tends to curl into hollow cylindrical shapes when not restrained. While curling blankets would not normally require circumferential tension members for initial placement around a pipe, such tension members may be applied after placement to prevent accidental unwinding of the blanket during use.

Curling blanket materials according to the present invention preferably comprise at least two layers, at least one being relatively more dense, and resistant to puncture and tearing, while at least one layer is relatively more resilient and thicker. The latter layer, serving the function of a wall matrix layer, is preferably adapted to distribute the force of impact or penetration loads over the pipeline while tending to prevent crushing of the more dense layer against the pipeline, thus enhancing impact resistance and durability of the covers.

The desired curling tendency may be imparted to the blanket material by any of several methods, including the appropriate molding of blanket wall matrix comprising shape-retaining polymer material, the fabrication of multi-layer blankets on curved forms, the altering of wall layer size after blanket fabrication (e.g., as by post-fabrication heat shrinkage of one or more layers, resulting in a curling tendency analogous to that in a bimetallic thermometer strip which is exposed to a change in temperature), or the coupling of metallic coiled-spring elements to one or more blanket layers.

Another alternative or supplement to circumferential tension members to prevent blanket unwinding in pipeline covers comprising flexible blankets is the spaced application of adhesion means to opposing sides of a flexible blanket wrap. Spaced adhesion means may also be applied to curling blanket material to further inhibit unwinding of a pipe wrap. Adhesion means preferably include sticky patches (e.g., pieces of double-sided adhesive tape) applied to effectively cause successive layers of wrapped flexible blanket material to adhere to each other thus inhibiting unwinding of a blanket wrap. Alternative adhesion means preferably include hook-and-loop fastener strips, spots and areas applied to alternate sides of curling blanket material to effectively cause successive layers in a pipe wrap, whether concentric or spiral, to adhere to each other so as to inhibit unwinding of the wrap. Adhesion means, when used with any flexible blanket material of the present invention (including curling blanket material) are preferably applied so as to enhance (or to avoid degradation of) the material's visibility when applied as a pipeline wrap.

Thus, curling blanket pipeline covers of the present invention may conveniently be carried to a pipeline in the form of a substantially cylindrical bulk roll having a free leading edge and a roll width. The free edge may be held on a pipe by hand or secured there by one or more clamps or bands which act to couple the free edge and/or the adjacent portion of the curling blanket to the pipe and allow wrapping of a desired length of curling blanket around the pipe.

Curling blankets are generally intended to form at least one protective layer by completely encircling a pipe at least once, preferably 3 to 5 times. The number of layers applied (and therefore the degree of load force distribution or impact protection conferred) may be varied according to the specific conditions expected.

Curling blanket materials may be wrapped around a pipe from a bulk roll as a substantially concentric wrap having a variable number of layers and a width substantially equal to that of the bulk roll. The wrapping process may be terminated by cutting, tearing or otherwise separating the blanket wrapped around the pipe from that in the bulk roll along a predetermined line. To this end, certain preferred embodiments of curling blanket material have means for separating the material embedded or otherwise applied to the material at predetermined intervals to facilitate removing needed lengths of the material from a roll. In some embodiments, the means for separating are preferably reversible, allowing the joining of lengths of curling blanket material, as may be desirable when adding length to a continuous spiral wrap. Such means for separating may include, but are not limited to, perforated or otherwise weakened areas of the material, various types of slide fasteners (e.g., a zipper), or an easily removable tension element (e.g., a line of stitching).

As noted above, the wrap may be substantially limited to a length of pipe equal to the roll width, or the wrap may be applied in a spiral manner. Spirally wrapped curling blanket materials are preferably wrapped with overlap between 50% and 100% (more preferably between about 55% and about 95%) of bulk roll width to achieve effective load force distribution or impact protection with a desired (predetermined) number of blanket layers on the pipe. Continuous or discontinuous spirally wrapped pipe covers of curling blanket material may protect pipeline sections of an arbitrary length equal to or greater than the blanket (roll) width. Additionally, spiral wrapping (with relatively narrow strips of such material) may be applied individually to non-uniform or non-cylindrical pipeline shapes (e.g., valves, flanges, or pipeline intersections), to be secured there by adhesion means or circumferential tension elements as noted above.

Enhanced Pipeline Protection

Pipeline covers of curling blanket material (indeed, any pipeline covers according to the present invention) may additionally comprise an innermost layer of compliant material effective for preventing or reducing abrasion damage to an area of pipeline with which the innermost layer is in contact. Suitably compliant material for the innermost layer includes, e.g., butyl rubber. Pipeline covers having such compliant innermost layers may be particularly useful for protecting surface markings or coatings on pipelines. Note also that where enhanced protection is desired for a pipeline, modular covers of the present invention may be applied substantially concentrically (e.g., with a rigid cover placed directly over an earlier-applied curling blanket cover).

Attaching Modular Pipeline Covers

Pipeline covers of the present invention comprise one or more pipeline cover modules as described herein. Rigid and semi-rigid forms of cover modules may be provided with attaching means proximate the first and second ends which may join one cover module to one or more adjacent cover modules after the cover segment(s) of each module are applied to the pipe and secured by circumferential tension members. The attaching means (comprising, e.g., hook-and-loop fastener straps and associated anchoring hook-and-loop fastener pads, steel latches, nuts and bolts, or tongue-and-groove forms on the segments' first and second ends) act to prevent cover modules from sliding apart longitudinally on the pipe (which, should the sliding occur, would leave portions of the pipe unprotected). Attaching means on flexible blanket material (including curling blanket material) are adjacent to the first and second lateral edges and so designed as to avoid interference in wrapping the material around a portion of a pipeline. Note that attaching means are capable of joining one module to a plurality of modules (as at a junction of two or more pipelines), a nonsegmented module may be attached to a segmented module, and a substantially rigid module may be attached to a semi-rigid or flexible module. Note also that reference to attaching means herein includes attaching elements such straps, bolts, or extended latches as are necessary to physically connect adjacent modules, although these structures are not shown in all drawings.

When joining segmented modules, there is no requirement that adjacent segments cover substantially equal portions of the circumference to be protected. For example, one 180° rigid segment in a first module may be attached to a longitudinally split (from first to second end) semi-rigid cylindrical form in a second (longitudinally adjoining) module. Cover modules comprising curling blanket material may be attached to adjacent modules by attaching means bonded, embedded, or otherwise coupled to the lateral edges of the curling blanket material. Such attaching means for curling blanket material are preferably designed so as not to interfere substantially with concentric or spiral wrapping of the material around a pipe.

DETAILED DESCRIPTION

In embodiments of modular pipeline covers according to the present invention which have a plurality of layers, outer layers may comprise, for example, high-strength plastic (e.g., polycarbonate), sheet metal (e.g., sheet steel), sheet metal bonded to high-strength plastic, nonstick plastic (e.g., polytetrafluoroethylene) bonded to metal or high-strength plastic, or simply high-strength plastic. Wall matrices may comprise, for example, polymers in a solid form, such as polyvinyl chloride or polyethylene, or high-density polymer foam such as polyrurethane. Recycled materials (e.g., shredded rubber from used tires or plastic from recycled containers) as well as material of substantially vegetable origin, (e.g., vegetable fiber in the form of adhesively bonded nonwoven sheets or mats) may also be used in wall matrix compositions. Note that in some embodiments, the wall matrix may comprise substantially the same material as the outer layer(s), and an outer layer may comprise a relatively thin coating or composition having one or more of the desirable properties of puncture resistance, high visibility, or a warning function.

In preferred embodiments, the wall matrix may have substantially zero electrical conductivity (i.e., the matrix may be substantially an electrical insulator). Wall matrices or outer layers may also incorporate proximity detectors (e.g., electrical circuit elements for detecting changes in electrical capacitance between the cover and nearby structures such as a excavation machinery). Sources of electromagnetic radiation (e.g., visible light sources or low-intensity radioactive sources) may also or alternatively be incorporated in the covers to accomplish the warning function.

The preferred thicknesses for outer layer(s) and wall matrices are determined by factors such as weight constraints, the desired degree of impact protection, the material(s) chosen for each layer, and the type and amount of any woven fiber reinforcement which may be present in any layer. Outer layers, being generally more dense, are also preferably thinner than wall matrices, in order reduce bulk and to keep the entire modular cover relatively light.

High visibility relative to the remainder of the pipeline and surrounding surfaces is desirable for effective protection, and such visibility is enhanced if the modular covers are specified to have greater average surface luminance or surface diffuse reflectance than that expected for the pipeline itself or for structures near the pipeline. Preferred embodiments of the present invention have surface diffuse reflectance values greater than about 10%, and more preferably greater than about 30%.

High surface luminance in the protective covers may be readily achieved through application of highly reflective or even light-emitting (e.g., fluorescent, phosphorescent or electroluminescent) materials as coatings to the surface of the covers. Alternatively, high luminance materials (e.g., reflective glass beads) may be mixed with the outer layer(s) and/or the resilient wall matrix material. Penetration of any of the reflective layers, as by a puncture or tear, would then result in additional exposed reflective surface. The exposed surface would act as a readily measured indicator of the extent of cover damage subsequent to any impact, as well as a continuing deterrent to further damaging contact with the pipe.

High visibility, however, is a subjective sensation which is not generally conferred only by high luminance, but also by the physical appearance (e.g., color, texture, surface pattern) of the protective covers. Patterns and colors which aid visibility may also identify pipeline contents. Those skilled in the art will recognize that methods to quantitatively specify acceptable levels of visibility for pipeline covers to be used adjacent to (and contrasting with) various background colors and textures may be specified.

In preferred embodiments, the protective modular cover wall matrix may comprise a plurality of layers of contrasting appearance. Impact damage resulting in tears or punctures to such a layered cover may be quickly assessed visually by determining which of the contrasting appearance layers is visible and how deep within the cover that layer would be found. In this regard, added illumination with visible or invisible light may be applied internally or externally to a protective cover to enhance the visibility and/or contrast of one or more layers.

Pipes to which protective covers may be applied often have specialized coatings or tape wraps (e.g., to identify pipeline contents and/or provide corrosion protection for the pipe wall). Hence, protective pipeline covers, according to the present invention, may have an innermost layer of shock-absorbing and/or compliant material which will tend to reduce abrasion due to relative movement of the cover with respect to the pipe after installation. Suitably compliant material for the lining would include various synthetic rubber compounds (e.g., butyl rubber).

As an aid in preventing penetration damage to protective covers of the present invention, flexible, rigid and semi-rigid forms of the covers may employ woven fibrous reinforcement. Preferred embodiments may thus include, for example, woven steel wire or aramid fiber fabric (e.g., KEVLAR brand aramid fiber fabric) or analogously strong woven materials) embedded within the resilient wall matrix or outer layer.

Figure 1:
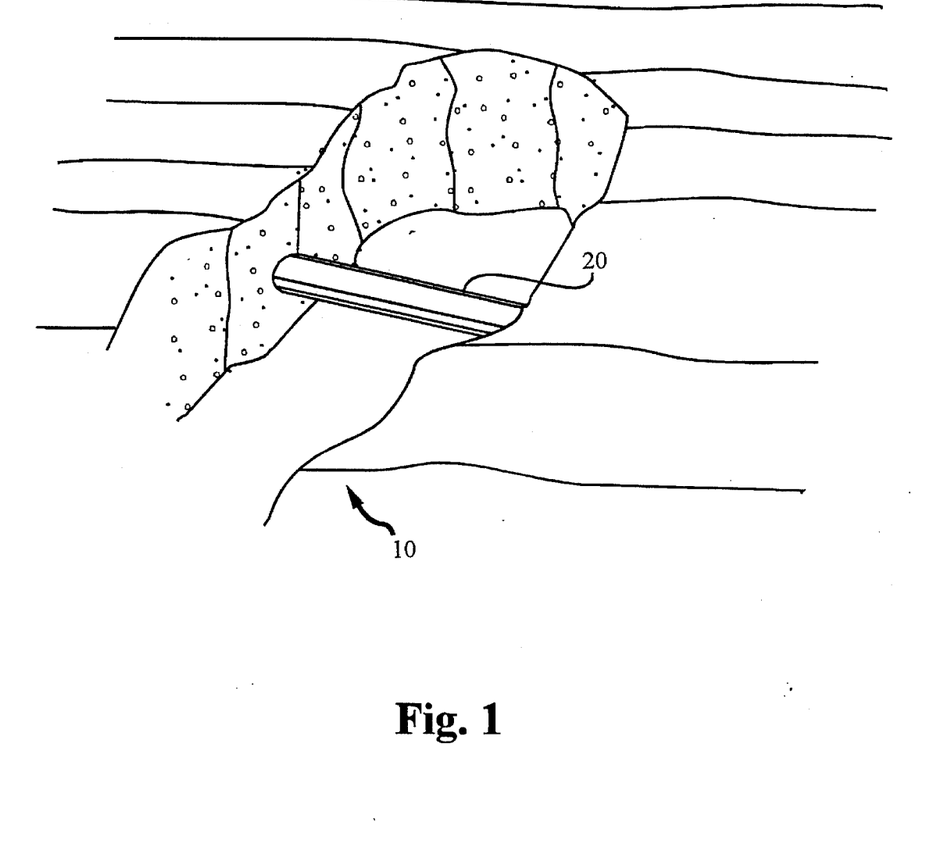
FIG. 1 illustrates an excavation which has exposed a buried pipeline to possible damage by excavation equipment.

FIG. 1 illustrates an excavation 10 which has exposed a buried pipeline 20. Further excavation with power equipment might damage pipeline 20 accidently unless it is protected from impact and penetration. Accidental contact with pipeline 20 by the power equipment would be less likely to occur if the pipeline 20 were more visible than it is when newly exposed in the ground.

Figure 2:
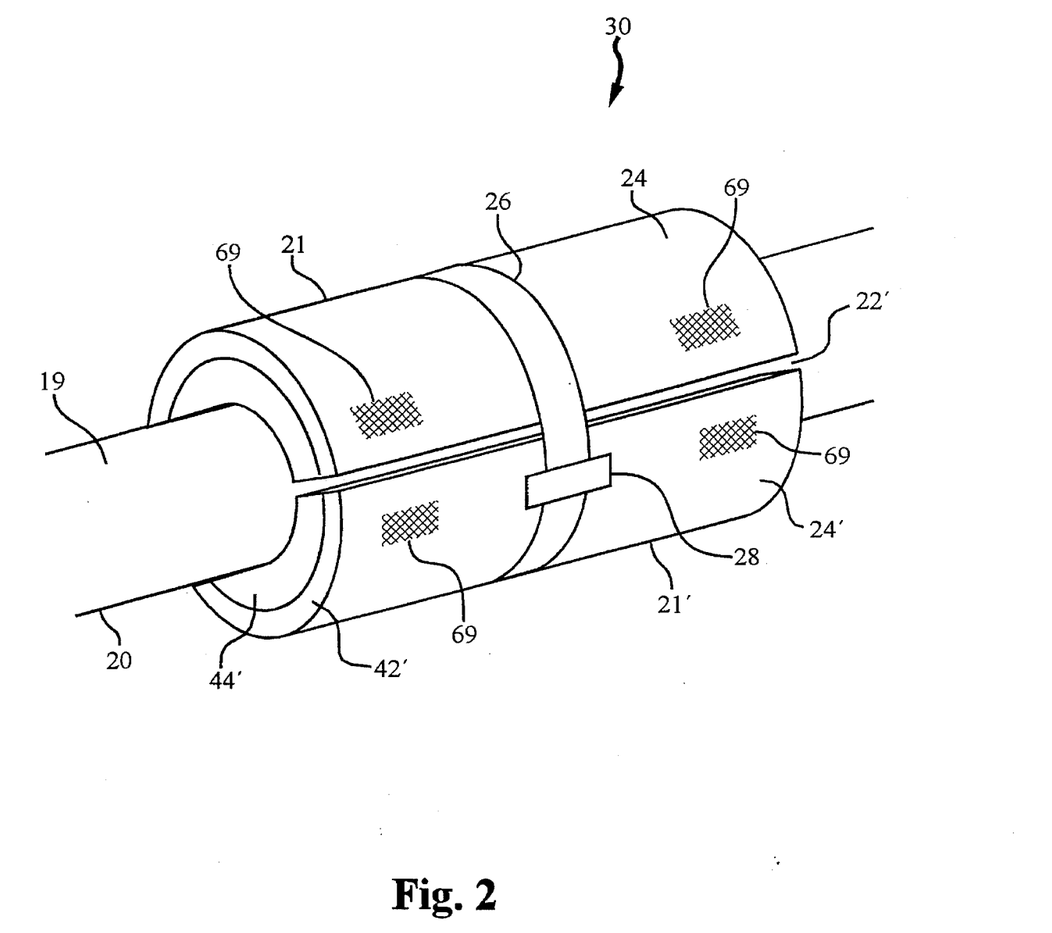
FIG. 2 illustrates a protective cover according to the present invention applied around a pipe.
Figure 3:
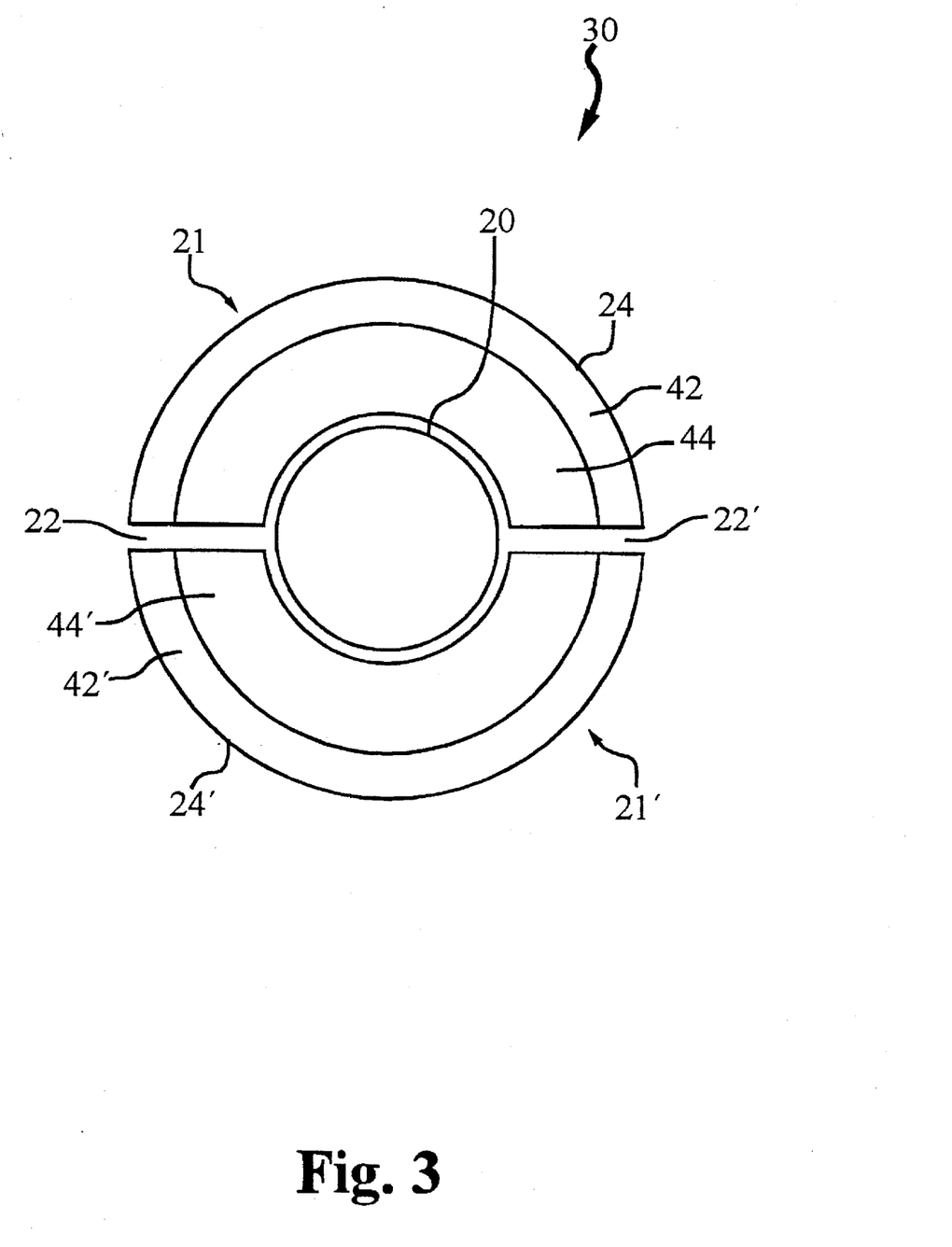
FIG. 3 illustrates a pipeline cover comprising two longitudinal segments.

FIG. 2 (an isometric view) and FIG. 3 (a cross-sectional view) illustrate a rigid protective pipeline cover 30 comprising a plurality (two are shown) of longitudinal segments 21, 21' which are applied around pipeline 20 and which meet at longitudinal butt joints 22, 22'. Segments 21, 21' are held in place by circumferential tension member (strap) 26 and strap clamp 28. Segments 21, 21' comprise a plurality of layers (two are shown), i.e., wall matrices 44, 44' and outer layers 42, 42' respectively. Outer layers 42, 42' have relatively greater resistance to penetration and tearing than wall matrices 44, 44', whereas wall matrices 44, 44' act to distribute any concentrated force applied to outer layers 42, 42' respectively, applying the force to a relatively larger area of pipeline 20 than the area of force application on outer layers 42, 42'. The external surfaces 24, 24' of longitudinal segments 21, 21' of cover 30 have greater visibility than pipeline 20 because they have greater diffuse reflectance than surface 19 of pipeline 20 (see FIG. 2). Cover 30 has attaching means 69 adjacent its first and second ends to facilitate attachment of cover 30 to another modular pipeline cover (not shown) which may be applied to pipeline 20 adjacent to cover 30.

Figure 4:
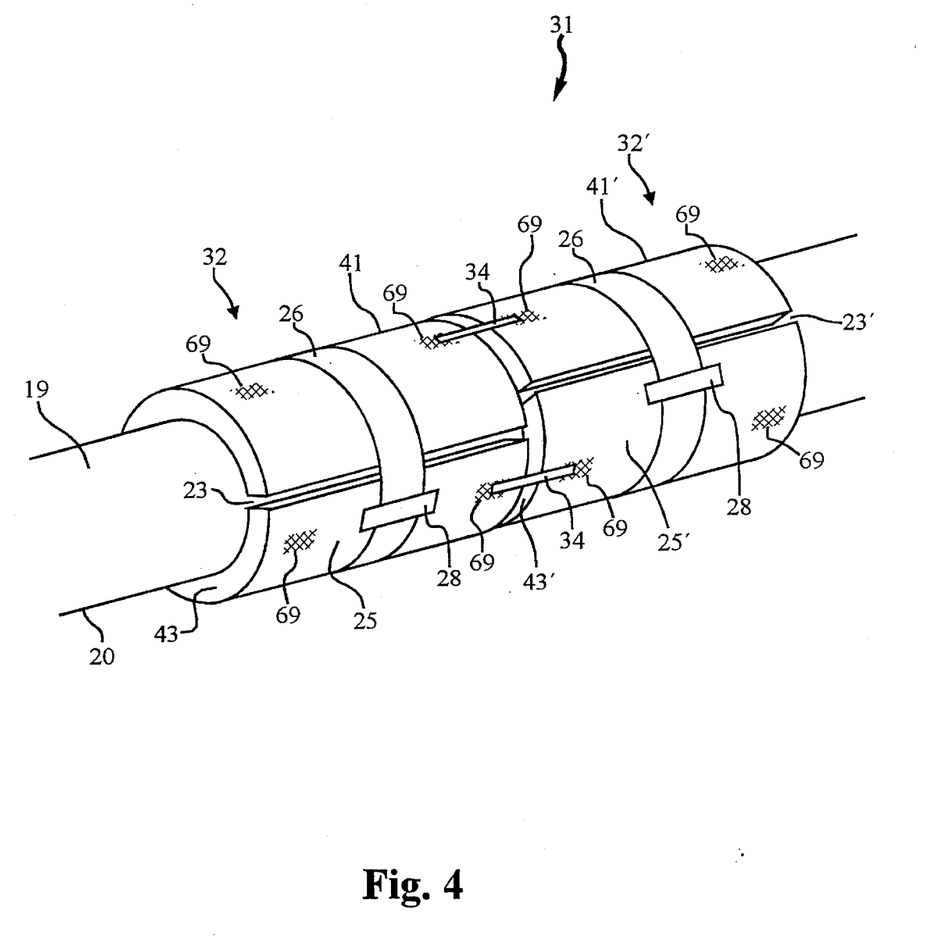
FIG. 4 illustrates two adjacent modular covers attached end-to-end to form a modular protective pipeline cover.

FIG. 4 illustrates two adjacent semi-rigid modular covers 32, 32' attached end-to-end on pipeline 20 to form a modular protective pipeline cover 31. Covers 32, 32' each comprise a single longitudinal segment 41, 41' having a single longitudinal split 23, 23' respectively. Splits 23, 23' are wide enough and said covers 32, 32' are flexible enough to allow splits 23, 23' to be spread and covers 32, 32' respectively to be placed around the pipeline 20 using manual force only. Splits 23, 23' are held substantially closed after application of covers 32, 32' to pipeline 20 by circumferential tension members (straps) 26 and strap clamps 28. Attaching means 69 are illustrated adjacent first and second ends of covers 32, 32', and attaching elements 34 are shown physically joining covers 32, 32' at adjacent sites of attaching means 69 on the respective covers. Covers 32, 32' each comprise single wall matrix layers 43, 43' having outer surfaces 25, 25' respectively. Single wall matrix layers 43, 43' are penetration and tear resistant, and of sufficient thickness to cause distribution of a concentrated force on outer surfaces 25, 25' to be distributed over a relatively greater area of pipeline 20 than the area of the concentrated force. Single wall matrix layers 43, 43' may comprise single species such as, for example, high-density polymer foam or woven fibrous material, including nylon and aramid fiber. Outer surfaces 25, 25' are highly visible relative to pipeline because they have substantially higher diffuse reflectance than surface 19 of pipeline 20.

Figure 5:
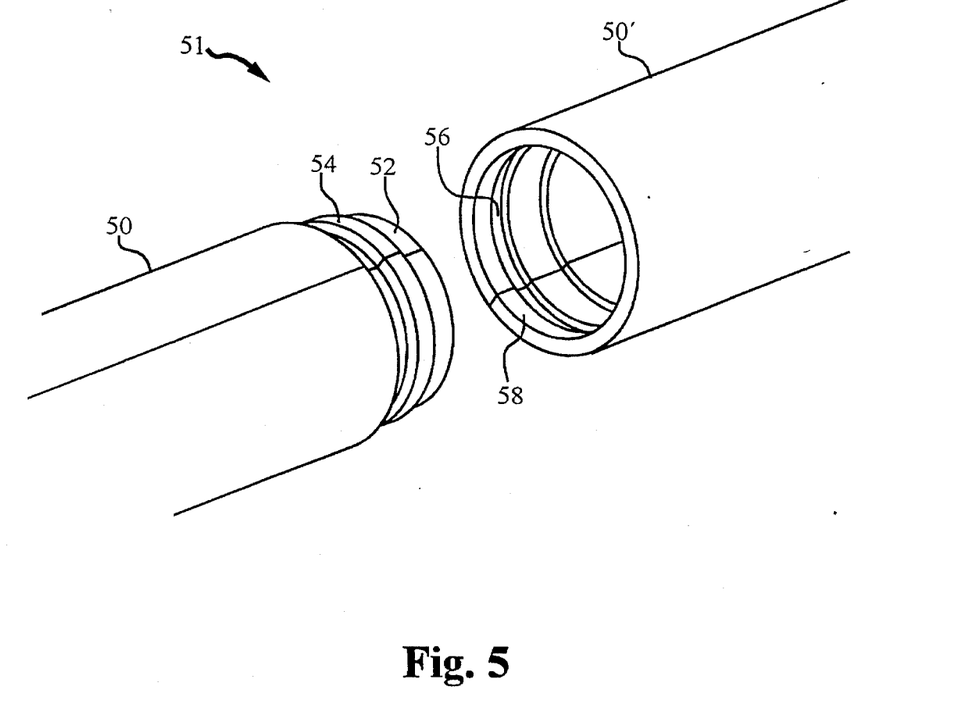
FIG. 5 illustrates one type of attaching means shown on a modular cover.
Figure 6A:
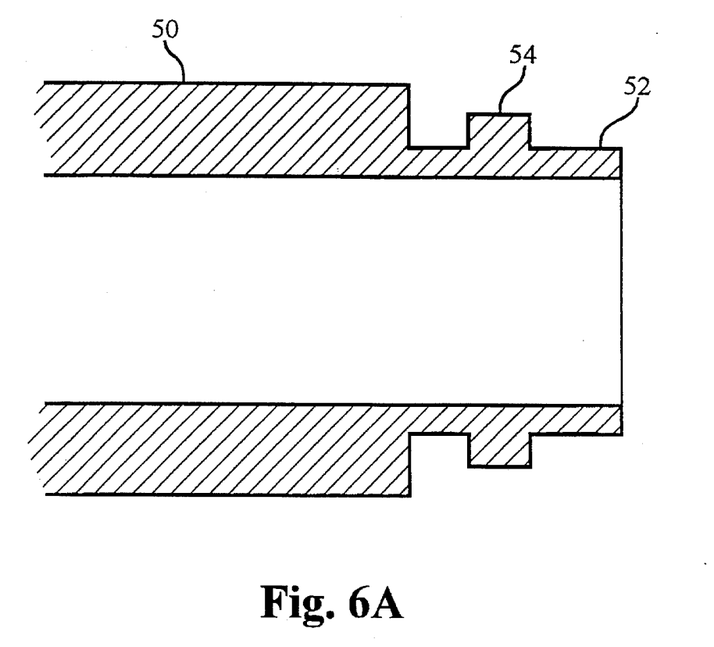
FIG. 6A illustrates a longitudinal cross-section of a modular pipeline cover showing detail of the shape of the retainer ring.
Figure 6B:
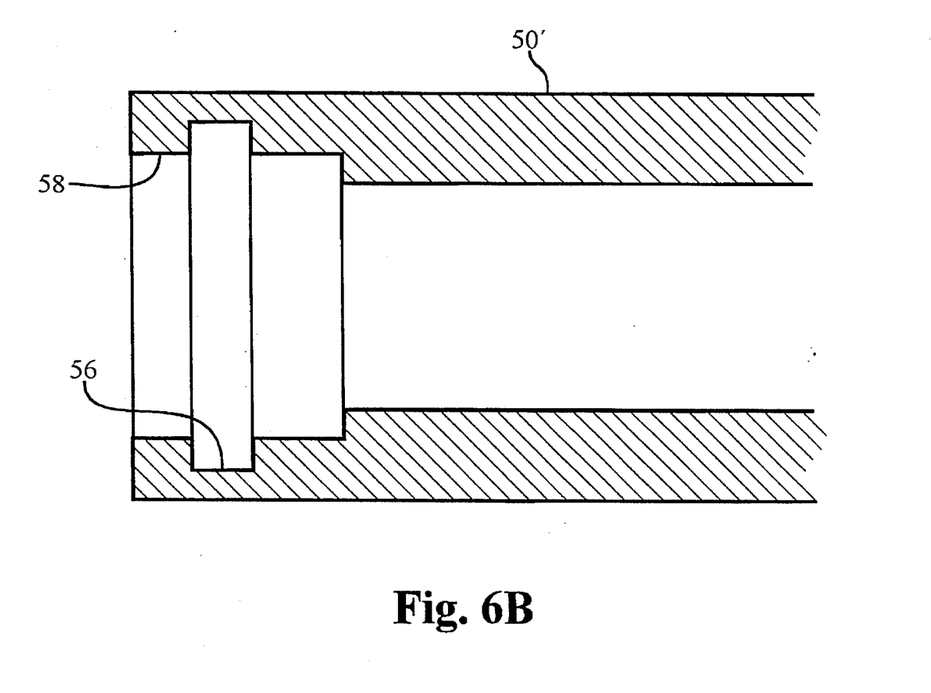
FIG. 6B illustrates a longitudinal cross-section of a modular pipeline cover showing detail of the groove which accepts the retainer ring.

FIG. 5 illustrates one type of attaching means 51 shown illustrated on modular covers 50, 50', the attaching means comprising a male cover end 52 having a retainer ring 54. The male cover end 52 fits into female cover end 58, and retainer ring 54 snap fits into groove 56. The two covers 50, 50' may be snapped together or pulled apart manually. FIG. 6A is a longitudinal cross-section of cover 50 showing detail of the shape of retainer ring 54. FIG. 6B is a longitudinal cross-section of cover 50' showing detail of groove 56.

Figure 7:
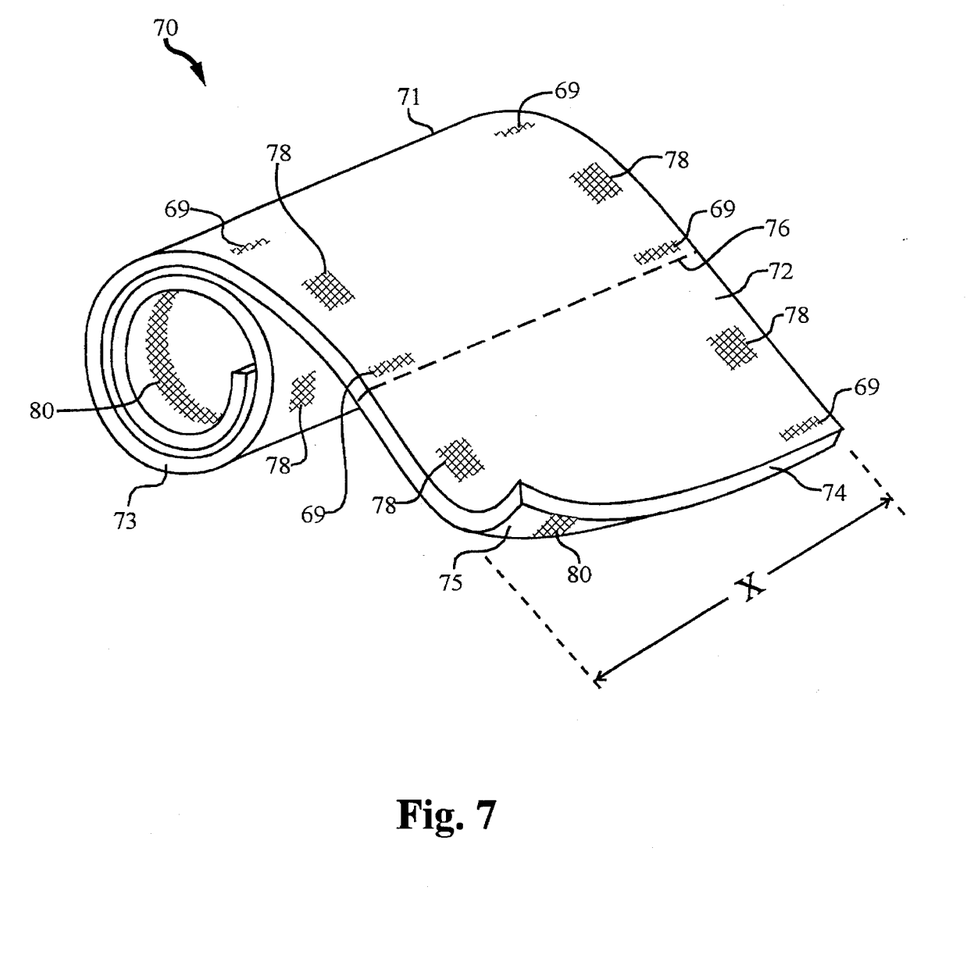
FIG. 7 illustrates a bulk roll of curling blanket material having a free leading edge, adhesion means, and separation means.

FIG. 7 illustrates a bulk roll 70 of curling blanket material 71, the material 71 having a relatively dense outer layer 72, a relatively less dense and thicker wall matrix layer 73, and a relatively compliant innermost layer 75. Adhesion means (e.g., hook-and-loop fastener strips 80 and spots 78, available, for example, under the VELCRO brand name) are applied to the accessible surfaces of layers 72, 75 to effectively inhibit unwinding of roll 70. Bulk roll 70 has a roll width X and a free leading edge 74, the edge 74 being useful for starting a protective pipe wrap according to the present invention. Bulk roll 70 also has spaced means for separating the blanket material 76 within the curling blanket material 71 to facilitate separation of a desired portion of the material 71 from bulk roll 70. In certain preferred embodiments, the means for separating the blanket material 76 are reversible (e.g., a zipper), allowing successive bulk rolls 70 to be sequentially wrapped around a pipeline, the curling blanket material 71 of each bulk roll 70 being joined to analogous material 71 in bulk rolls 70 preceding and/or following it in the pipe wrap. Note that attaching means 69 are of relatively flat design and are so coupled to blanket material 71 as to avoid interference with the protective function of any wrap of which blanket material 71 may be a part. Note also that attaching means 69 is preferably compatible with and capable of coupling with attaching means 34 (shown in FIG. 4 and described herein).

Figure 8A:
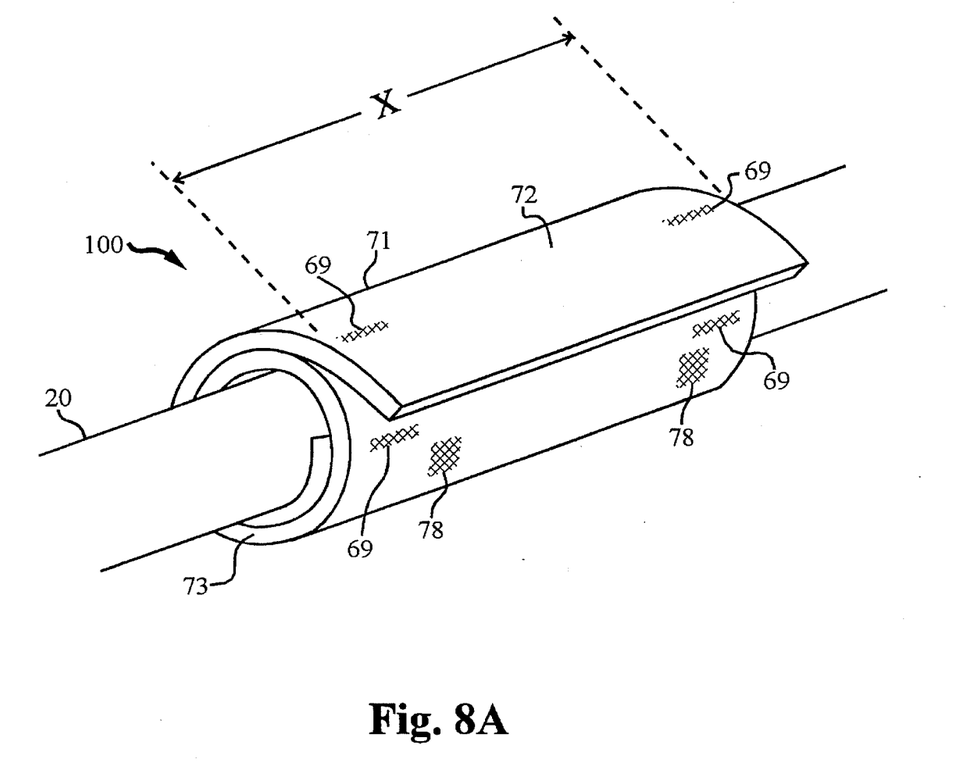
FIG. 8A illustrates a concentric pipe wrap of curling blanket material with adhesion means to inhibit unwinding of the wrap.

FIG. 8A illustrates a concentric pipe wrap 100 of curling blanket material 71 on pipeline 20, pipe wrap 100 having a width X substantially equal to the width X of curling blanket material 71 itself. Pipe wrap 100 comprises at least one layer of curling blanket material 71, the blanket material 71 having a relatively more dense (and relatively more penetration-resistant) outer layer 72 and a relatively less dense and thicker wall matrix layer 73, the inner layer of the curling blanket material 71 comprising wall matrix layer 73. Adhesion means 78 (e.g., adhesive patches) are illustrated coupled to outer layer 72 so as to cause adjacent layers of the curling blanket material 71 within wrap 100 to adhere, thus inhibiting unwinding of pipe wrap 100. Note that attaching means 69 are of relatively flat design and are so coupled to blanket material 71 as to avoid interference with the protective function of any wrap of which blanket material 71 may be a part. Note also that attaching means 69 is preferably compatible with and capable of coupling with attaching means 34 (shown in FIG. 4 and described herein).

Figure 8B:
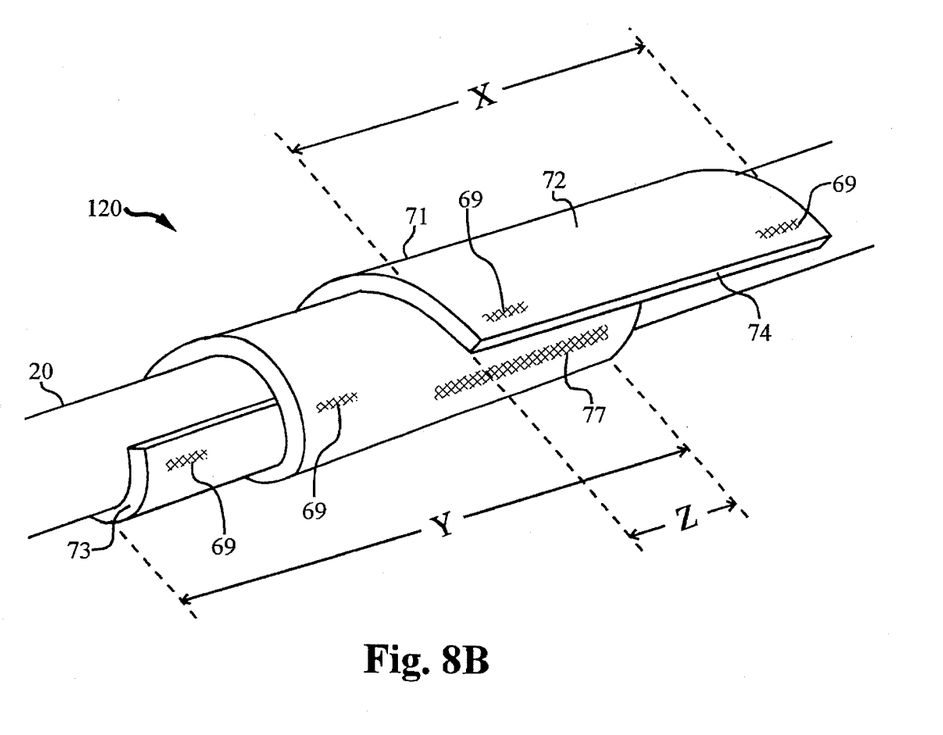
FIG. 8B illustrates a spiral pipe wrap of curling blanket material with adhesion means to inhibit unwinding of the wrap.

FIG. 8B illustrates a spiral pipe wrap 120 of curling blanket material 71 around pipeline 20, pipe wrap 120 having a width Y substantially greater than the width X of curling blanket material 71 itself. Pipe wrap 120 comprises at least one layer of curling blanket material 71, the blanket material 71 having a relatively more dense (and relatively more penetration-resistant) outer layer 72 and a relatively less dense and thicker wall matrix layer 73, the inner layer of the curling blanket material 71 comprising wall matrix layer 73. Adhesion means 77 (e.g., adhesive strips) are illustrated coupled to outer layer 72 so as to cause adjacent layers of the curling blanket material 71 within wrap 120 to adhere, thus inhibiting unwinding of pipe wrap 120. Preferred embodiments of spiral pipe wrap 120 incorporate elongated adhesion means 77 to allow flexibility in determining the amount of overlap Z of each layer of blanket material 71 on the previous layer. Note that the percent overlap for spiral pipe wrap 120 is determined by the mathematical term $((Z/X) \times 100)$. Spiral pipe wrap 120 may be predetermined to have a plurality of layers of curling blanket material 71 by predetermining a value of percent overlap between 50% and 100%, preferably between about 55% and about 95%. Note that attaching means 69 are of relatively flat design and are so coupled to blanket material 71 as to avoid interference with the protective function of any wrap of which blanket material 71 may be a part. Note also that attaching means 69 is preferably compatible with and capable of coupling with attaching means 34 (shown in FIG. 4 and described herein).

What is claimed is:

1. A protective pipeline cover for installation on a pipeline section, said cover comprising a plurality of longitudinal segments, each said segment having a first end, a second end, an inner surface, and an outer surface, each said outer surface having diffuse reflectance greater than about 10%, each said segment comprising at least one wall matrix and at least one layer of puncture-resistant material; and at least one circumferential tension member for retaining said segments in place around the pipeline section.

2. The protective cover of claim 1 including an attaching means located adjacent said first and second ends of said longitudinal segments for connecting said cover to a second cover adjacent thereto.

3. The protective cover of claim 2 wherein each said longitudinal segment comprises a single wall matrix layer, said wall matrix layer comprising puncture-resistant material.

4. The protective cover of claim 3 wherein each said single wall matrix layer comprises polyethylene.

5. The protective cover of claim 1 wherein each said longitudinal segment comprises a plurality of layers.

6. The protective cover of claim 5 wherein each said longitudinal segment comprises an outer layer and a wall matrix layer, said outer layer being thinner and more puncture-resistant than said wall matrix layer, and said outer layer being reinforced with woven aramid fiber.

7. A protective pipeline cover for attachment to a pipeline section, said cover comprising a longitudinal segment, said segment comprising
at least one layer of puncture-resistant material;
at least one wall matrix;
a first end, a second end, an inner surface, and an outer surface, said outer surface having diffuse reflectance greater than about 10%;
a substantially longitudinal split extending from said first end to said second end; and at least one circumferential tension member for retaining said segment in place on the pipeline section.

8. The protective cover of claim 7 wherein said longitudinal segment comprises a single wall matrix layer.

9. The protective cover of claim 8 wherein said single wall matrix layer comprises high-density polyurethane foam.

10. The protective cover of claim 9 wherein said high-density polyurethane foam is reinforced with woven aramid fiber.

11. The protective cover of claim 7 wherein each said longitudinal segment comprises a plurality of layers.

12. The protective cover of claim 11 wherein each said longitudinal segment comprises an outer layer and a wall matrix layer, said outer layer being thinner and more puncture-resistant than said wall matrix layer, and said outer layer being reinforced with woven aramid fiber.

13. A protective pipeline cover for attachment to a section of pipeline, the cover comprising a flexible blanket having an inner surface, an outer surface, a first lateral edge, and a second lateral edge, said outer surface having diffuse reflectance greater than about 10%, said blanket comprising at least one layer of puncture-resistant material and at least one wall matrix;

means for securing said blanket in place around a section of pipeline; and attaching means located adjacent said first lateral edge and said second lateral edge of said blanket for connecting said cover to an adjacent cover.

14. The protective cover of claim 13 wherein said blanket is a curling blanket.

15. The protective cover of claim 14 wherein said blanket additionally comprises means for separating a desired portion of the blanket from its remaining portion.

16. The protective cover of claim 13 wherein said layer of puncture-resistant material comprises woven aramid fiber.

17. The protective cover of claim 13 wherein said blanket additionally comprises adhesion means for preventing unwinding of said blanket upon installation on said pipeline.

18. The protective cover of claim 13 wherein said outer surface is fluorescent.

19. A protective pipeline cover comprising a plurality of the covers of claim 16.

20. A method of protecting a pipeline, comprising providing a flexible blanket having an inner surface, an outer surface, a first lateral
edge, and a second lateral edge, said outer surface having diffuse reflectance greater than about 10%, said blanket comprising
at least one layer of puncture-resistant material;
at least one wall matrix; and
attaching means located adjacent said first lateral edge and said second lateral edge of said blanket;

circumferentially wrapping the pipeline with at least one layer of said flexible blanket; and securing said flexible blanket around the pipeline with at least one circumferential tension member.

* * * * *